US009567973B2

(12) United States Patent
Pasquet

(10) Patent No.: US 9,567,973 B2
(45) Date of Patent: Feb. 14, 2017

(54) PITCH SYSTEM FOR A WIND TURBINE ROTOR

(71) Applicant: ALSTOM RENOVABLES ESPAÑA, S.L., Barcelona (ES)

(72) Inventor: Pierre Pasquet, Alella (ES)

(73) Assignee: Alstom Renovables España, S.L., Barcelona (ES)

( * ) Notice: Subject to any disclaimer, the term of this patent is extended or adjusted under 35 U.S.C. 154(b) by 789 days.

(21) Appl. No.: 13/928,222

(22) Filed: Jun. 26, 2013

(65) Prior Publication Data

US 2014/0003944 A1 Jan. 2, 2014

Related U.S. Application Data

(60) Provisional application No. 61/693,696, filed on Aug. 27, 2012.

(30) Foreign Application Priority Data

Jun. 27, 2012 (EP) ..................................... 12382253

(51) Int. Cl.
*F03D 7/02* (2006.01)
*F03D 1/06* (2006.01)

(52) U.S. Cl.
CPC ........... *F03D 7/0224* (2013.01); *F03D 1/0658* (2013.01); *F03D 80/70* (2016.05); *Y02E 10/721* (2013.01); *Y02E 10/722* (2013.01); *Y02E 10/723* (2013.01)

(58) Field of Classification Search
CPC ... F03D 1/0658; F03D 11/0008; F03D 7/0224
See application file for complete search history.

(56) References Cited

U.S. PATENT DOCUMENTS

| | | | |
|---|---|---|---|
| 2,017,505 A * | 10/1935 | Meon | B64C 11/06 416/147 |
| 2,109,696 A * | 3/1938 | Hackethal | B64C 11/06 416/147 |

(Continued)

FOREIGN PATENT DOCUMENTS

| | | |
|---|---|---|
| DE | 1270411 | 6/1968 |
| EP | 2175133 | 4/2010 |

(Continued)

OTHER PUBLICATIONS

Extended European Search Report for Appl. No. EP12382253.8, mailed Feb. 5, 2013, 5 pgs.

*Primary Examiner* — Woody Lee, Jr.
(74) *Attorney, Agent, or Firm* — Dority & Manning, P.A.

(57) ABSTRACT

A pitch system for a wind turbine rotor, comprising a first bearing and a second bearing, each provided with an outer race, an inner race, and at least one row of rolling elements, the first and second bearings being adapted to be arranged between a hub and a blade root portion or extender, to allow rotation of the blade with respect to the hub, wherein the first bearing is adapted to be arranged nearer to the hub than the second bearing in the axial direction, the pitch system further comprising an intermediate body arranged between the first bearing and the second bearing in the axial direction, said intermediate body comprising at least a blade-side part extending between the race of the first bearing that is associated with the blade and the race of the second bearing that is associated with the blade.

19 Claims, 4 Drawing Sheets

(56) References Cited

U.S. PATENT DOCUMENTS

| | | | | |
|---|---|---|---|---|
| 2,460,910 | A | * | 2/1949 | Sheets ................. B64C 11/06 416/205 |
| 4,364,708 | A | * | 12/1982 | David .................. F03D 1/0658 416/132 B |
| 8,459,946 | B2 | * | 6/2013 | Yoshida ............... F03D 7/0224 416/153 |
| 2008/0213095 | A1 | * | 9/2008 | Bech .................... F03D 1/0658 416/131 |
| 2009/0175724 | A1 | | 7/2009 | Russ et al. |
| 2010/0215307 | A1 | | 8/2010 | Loeschner et al. |

FOREIGN PATENT DOCUMENTS

| WO | WO 2007/003866 | 1/2007 |
|---|---|---|
| WO | EP 2094981 | 6/2008 |
| WO | WO 2012/044771 | 4/2012 |

\* cited by examiner

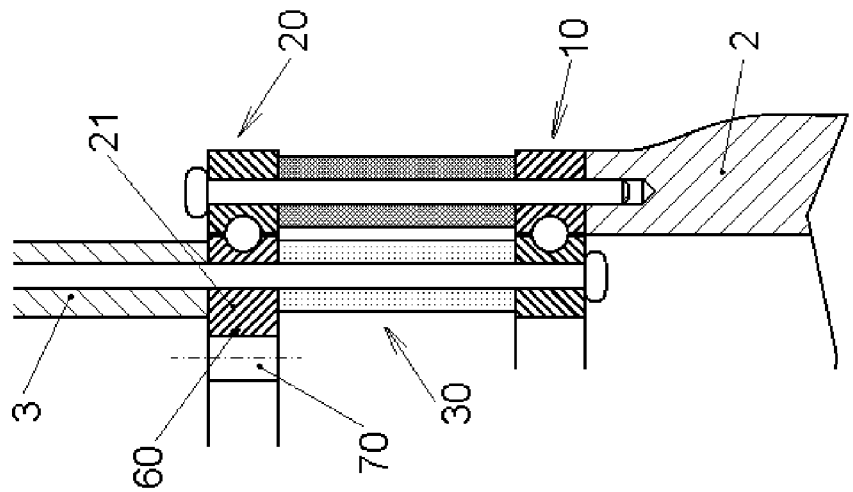
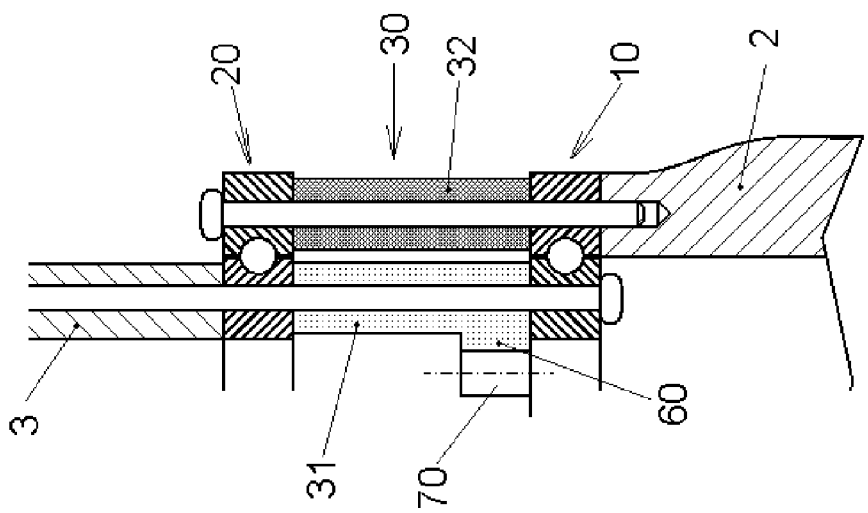
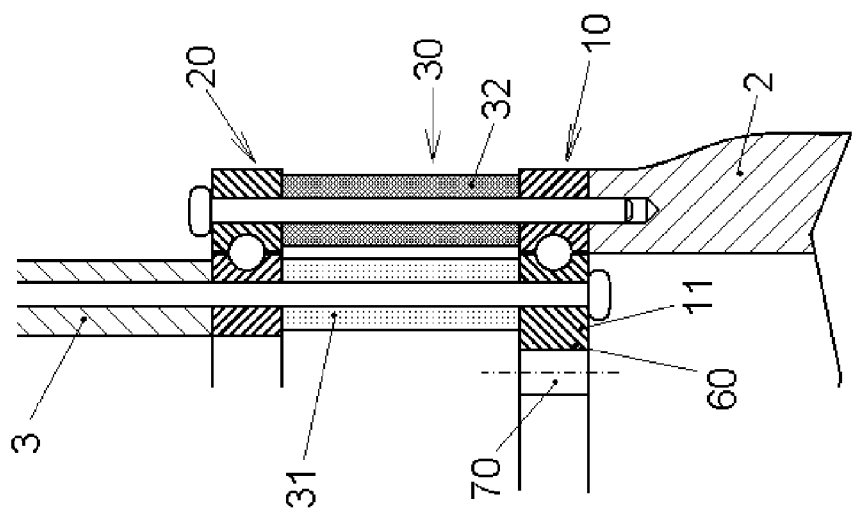

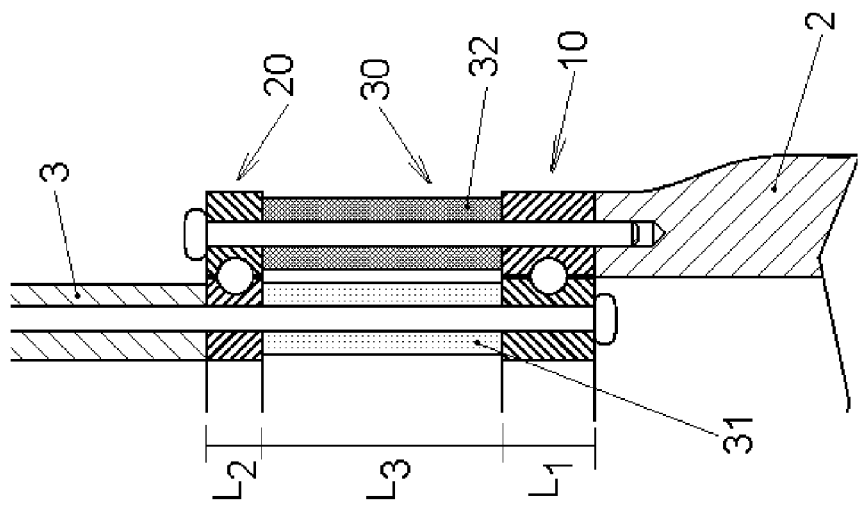
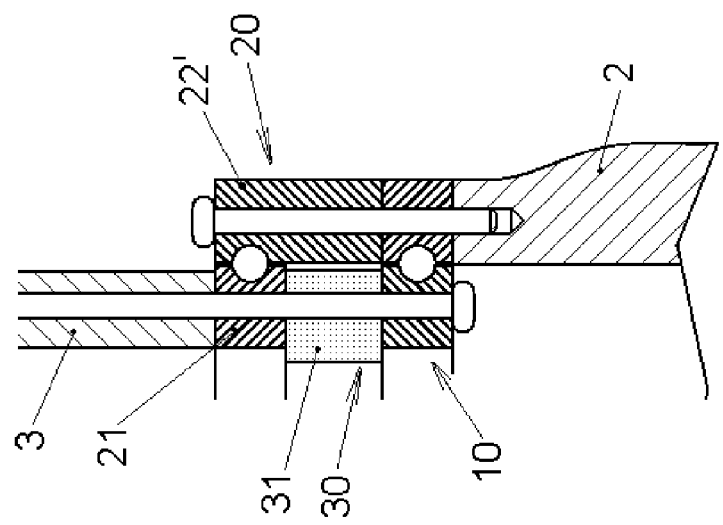
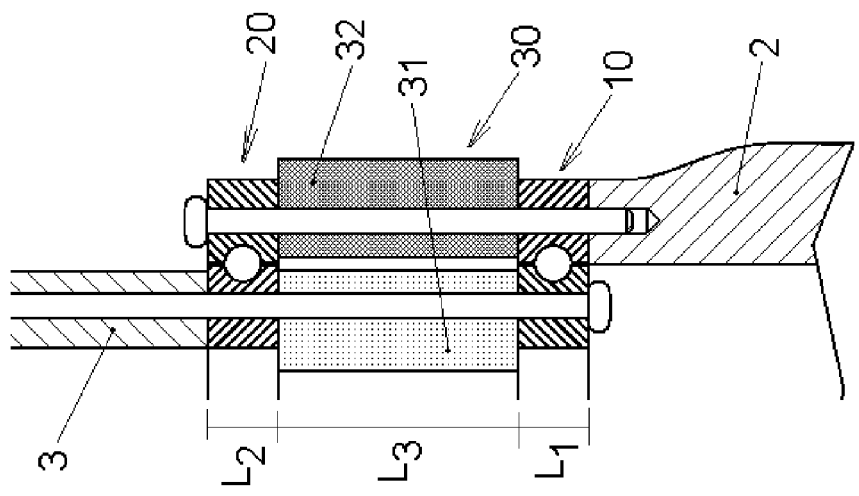

PITCH SYSTEM FOR A WIND TURBINE ROTOR

This application claims the benefit of European Patent Application EP 12382253.8 filed on 27 Jun. 2012 and U.S. Provisional Patent Application Ser. No. 61/693,696 filed on 27 Aug. 2012, the disclosures of which are hereby incorporated by reference in their entirety for all purposes.

The present invention relates to a pitch system for a wind turbine rotor, and to a wind turbine having such a pitch system.

BACKGROUND ART

Known wind turbines have a rotor generally comprising a hub and three turbine blades mounted on the hub. The load on the rotor may be controlled by pitching the blades, i.e. by rotating each blade around its longitudinal axis (from root to tip) and cause the wind to engage a larger or smaller surface of the blade.

For the purpose of pitching the blades, each blade is mounted on the hub by means of a pitch system, which in known turbines comprises a pitch bearing arranged between the hub and the blade, and a pitch drive which may include a motor, a drive pinion, and an annular gear meshing with the pinion and causing the blade to rotate and change its pitch angle, upon rotation of the drive pinion.

A known pitch bearing has one of the bearing races, e.g. the outer race, connected to the hub, and the other bearing race, e.g. the inner race, connected to a blade root portion (or sometimes to an extender); the annular gear of the pitch drive may then be fixed to the inner race of the pitch bearing, such that its rotation causes rotation of the inner race of the bearing and of the blade attached thereto.

For attachment of the pitch bearing to the blade root portion and to the hub, it is known to provide a plurality of studs, screws, or similar elements, each extending through a bore in one of the bearing races and screwed or fixed in any other way to the hub or to the blade root portion. It is known that such studs need to withstand fatigue loads and that long studs are better suited to withstand fatigue than short studs, and it is therefore desirable to provide a pitch bearing construction that allows a sufficient stud length.

On the other hand, pitch bearings must stand several forces and moments, and in particular the bending moment caused by the force of the wind on the blades, that tends to strain especially the region of the bearing remote from the hub. One known construction employs a pitch bearing having two or three rows of rolling elements, usually balls, in order to transfer the torque from the blades to the hub and at the same time withstand bending loads.

However, the axial length of such pitch bearings is relatively large, and at the same time they need to have a suitable stiffness to withstand the loads; their construction is therefore relatively complex, and their cost rather high.

It would be desirable to provide a pitch system for a wind turbine rotor that is cost effective and of relatively simple construction.

SUMMARY

According to an aspect, the present invention provides a pitch system for a wind turbine rotor comprising a first bearing and a second bearing, each provided with an outer race, an inner race, and at least one row of rolling elements, the first and second bearings being adapted to be arranged between a hub and a blade root portion or extender, to allow rotation of the blade with respect to the hub, wherein the first bearing is adapted to be arranged nearer to the hub than the second bearing in the axial direction, the pitch system further comprising an intermediate body arranged between the first bearing and the second bearing in the axial direction, said intermediate body comprising at least a blade-side part extending between the race of the first bearing that is associated with the blade and the race of the second bearing that is associated with the blade.

The two bearings and the intermediate body provide a pitch system that has a good stiffness and is simple and cost effective, since each bearing may be fairly simple and of relatively small axial length, and therefore a relatively standard part, while the intermediate body may be manufactured with materials and qualities that can be more economic and easier to manufacture than bearings, and especially than known large multi-row pitch bearings.

The intermediate body may provide two different effects. In the first place, it may reinforce and stiffen the second bearing, and particularly the inner race thereof, which is subject to a larger bending moment due to the wind loads than the first bearing, and therefore reduces the strain of said second bearing and the risk e.g. of contact ellipse truncation that may arise in bearings of large diameter such as pitch bearings, due to their relatively small stiffness.

In the second place, the intermediate body can be made of a dimension that provides a suitable length for the studs that attach the pitch system to the blade and to the hub, and therefore makes it easier to employ studs with good fatigue behaviour.

The overall dimension of the pitch bearing, and the distance between the two bearings, can be adjusted and adapted to each particular case by simply changing the length and particular features of the intermediate body, which is much more cost effective than manufacturing in each case a large, multi-row pitch bearing.

The intermediate body may also be employed for the pitch drive, since it is simpler and cheaper to provide a toothing for the drive on the intermediate body than on a bearing race.

The presence of two separate bearings also makes it easier to provide each of them with features best suited to its position in the assembly; for example, in embodiments of the invention the first bearing may be of greater stiffness than the second bearing, for example it may have a larger axial length.

In embodiments of the invention the intermediate body further comprises an hub-side part arranged coaxially to the blade-side part and extending between the race of the first bearing that is associated with the hub and the race of the second bearing that is associated with the hub.

According to a further aspect, the invention provides a wind turbine further comprising at least a portion of an annular gear fixed to the a race of one of the first bearing or the second bearing, and suitable to mesh with a driving pinion of a pitch drive for changing the blade pitch.

In the present application reference is made generally to connections to a blade root portion and to a hub in the wind turbine rotor. Both expressions should be interpreted broadly: for example, within the meaning of the present invention, blade root portion may be any portion of the blade playing a role in the attachment of the blade to the rest of the rotor, such as a flange, or elements associated with the blade, such as a blade extender. The same is valid for the hub.

BRIEF DESCRIPTION OF THE DRAWINGS

Particular embodiments of the present invention will be described in the following by way of non-limiting examples, with reference to the appended drawings, in which:

FIGS. 3 to 5 show schematically in cross section a detail of a pitch system such as that of FIG. 2, with different embodiments of a pitch drive; and FIGS. 6 to 8 show schematically in cross section details of pitch systems according to further embodiments of the invention.

DETAILED DESCRIPTION OF EMBODIMENTS

Figure 1:
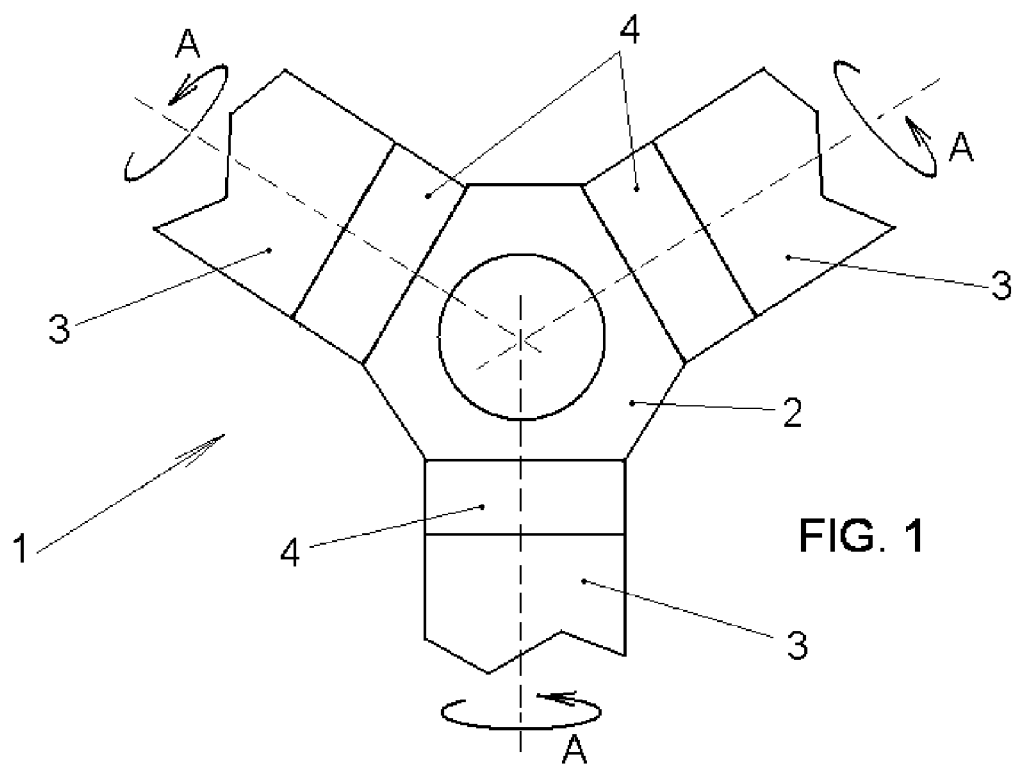
FIG. 1 shows schematically the rotor of a wind turbine with a pitch system associated with each blade.

FIG. 1 shows a wind turbine rotor 1, which may have a hub 2 and three blades, of which only a root portion 3 is shown in the figure, each attached to the hub 2 by means of a pitch system 4 that allows rotation of each blade around its longitudinal axis, as shown by arrows A, such that the wind engages a larger or smaller surface of the blade.

Figure 2:
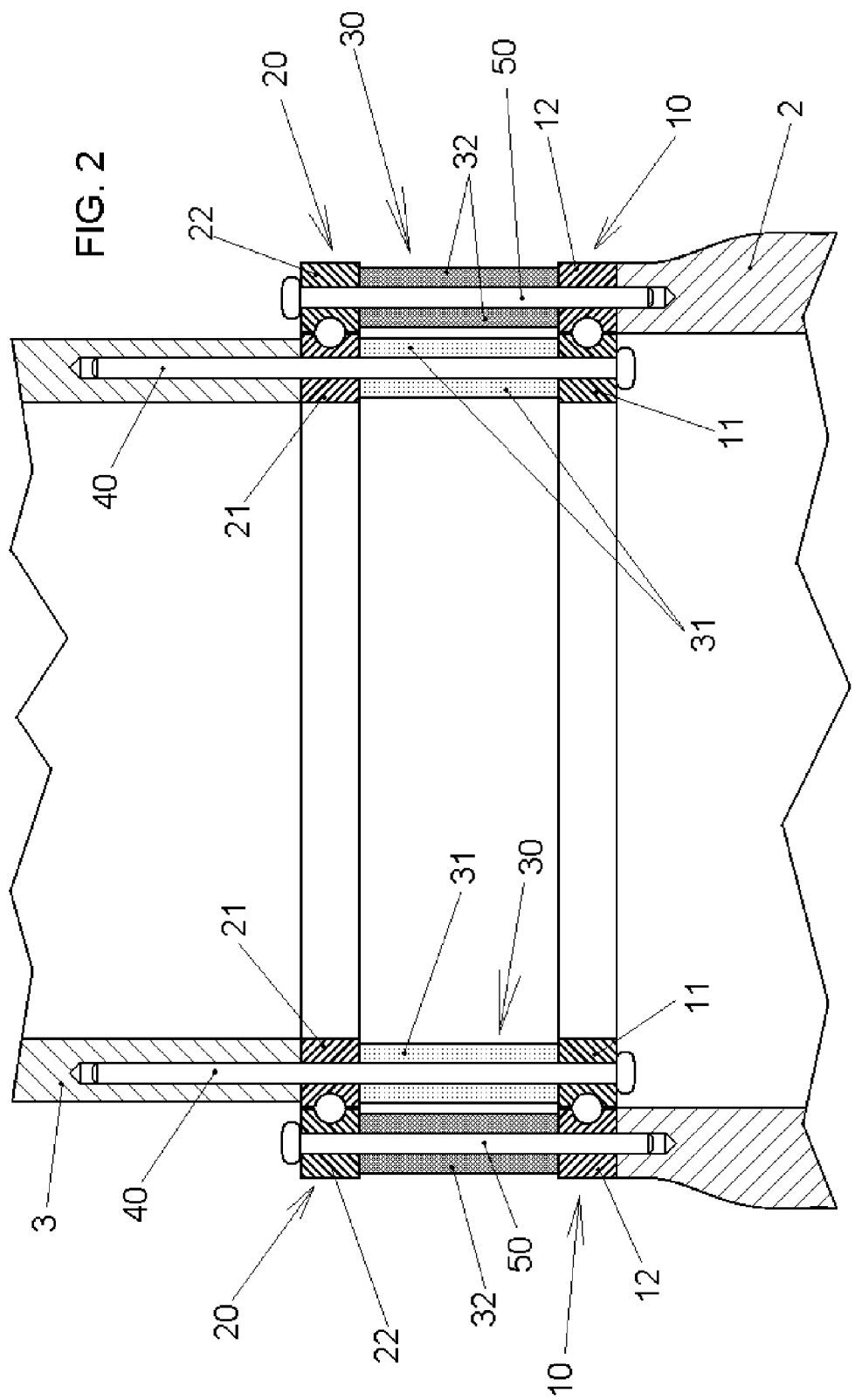
FIG. 2 shows schematically in cross section a pitch system according to an embodiment of the invention.

An embodiment of a pitch system 4 according to the invention is shown in FIG. 2. The pitch system comprises a first bearing 10 and a second bearing 20, the first bearing being arranged nearer to the hub 2. In this example, the inner race 11 and 21 of each bearing 10 and 20 is associated with the blade root portion 3, while the outer race 12 and 22 of each bearing 10 and 20 is associated with the hub 2, although in other embodiments the hub may be attached to the inner races and the blade may be attached to the outer races.

The pitch system 4 further comprises an intermediate body 30, which is arranged between the first bearing 10 and the second bearing 20 in the axial direction.

As shown in FIG. 2, the intermediate body 30 may comprise a blade-side part 31, (in this example an inner part) and a hub-side part 32 (in this example an outer part); the blade-side part 31 and the hub-side part 32 may be arranged coaxial to each other and to the bearings 10 and 20.

Both the blade-side part 31 and the hub-side part 32 may be substantially cylindrical, i.e. they may have a tubular or ring shape.

Each of the blade-side part 31 and the hub-side part 32 of the intermediate body 30, as well as the races 11, 12, 21 and 22 of the bearings 10 and 20, may be provided with a plurality of bores in the axial direction; suitable studs 40 and 50 may extend through the bores for attaching the bearing races 11, 12, 21, 22 and the intermediate body parts 31 and 32 to the blade root portion 3 and to the hub 2, respectively.

The intermediate body 30 may act as a stiffener or reinforcing element for the bearings; it may also be dimensioned to give a desired length to the pitch system assembly, to increase the distance between hub and blade, such that the studs 40 and 50 can have a sufficient length to guarantee a good fatigue behaviour.

The intermediate body 30 can be designed and built to perform one or both of these two functions in a very cost-effective way, since it doesn't need to be made of the same material of the bearing races, or with the same radial dimensions, shapes, tolerances, etc. Consequently, it may be provided at a relatively low cost and by a large variety of manufacturers.

Suitable materials for both the blade-side part 31 and the hub-side part 32 of the body 30 may be for example cast iron or any structural steel such as S355.

In a pitch system 4 according to embodiments of the invention, any of the bearing races 11, 12, 21, 22, or any of the parts 31, 32 of the intermediate body 30, may be employed for forming an annular gear, or at least a portion of an annular gear, of a pitch drive. The pitch drive is arranged to rotate the blade with respect to the hub, and thus change the pitch angle of the blade.

Details of three exemplary embodiments of a pitch system with such an annular gear are shown in FIGS. 3, 4 and 5.

In FIG. 3, the inner race 11 of the first bearing 10 forms at least a portion of an annular gear 60, suitable to mesh with a driving pinion 70 of the pitch drive (not further shown). Similarly, in FIG. 5 such an annular gear 60 is formed on the inner race 21 of the second bearing 20.

In an alternative embodiment, shown in FIG. 3, the annular gear 60, or a portion thereof, is formed on the blade-side part 31 (here the inner part) of the intermediate body 30. In this embodiment the provision of the annular gear 60 is quite straightforward, because the materials and manufacturing process of the intermediate body make it relatively simple and cost effective to form such a gear together with the body parts 31 or 32.

Although FIGS. 3, 4 and 5 show the annular gear associated with the inner side of the pitch system, it is understood that it could be also associated with the outer race 12 or 22 of one of the bearings 10, 20, or to the outer part (in this case hub-side part 32) of the intermediate body.

The length of the intermediate body 30 in the axial direction ($L_3$ in FIG. 6) will depend on the particular requirements of each case; in some embodiments it may be at least equal to the total axial length ($L_1+L_2$ in FIG. 6) of the first and second bearings, and in some cases it may be preferable that it is about twice said total length ($L_1+L_2$) of the first and second bearings.

FIG. 6 shows an embodiment in which the blade-side part 31 and the hub-side part 32 of the intermediate body 30 are larger in the radial direction than their associated bearing races, and thus extend beyond the races, inwardly and outwardly, respectively. Providing such an enlarged blade-side part 31 and/or hub-side part 32 may be helpful for example to provide more stiffness in some regions, if needed.

FIG. 7 shows a further embodiment of a pitch system, wherein the intermediate body 30 has a blade-side part 31 (in this example an inner part) but no hub-side part (outer part:): in this case, the outer race 22' of the second bearing 20 is longer in axial direction and acts as a spacer on the outer side of the pitch system.

Although the intermediate body has been described as having two substantially cylindrical blade-side and hub-side parts, in other embodiments each of these parts may have different configurations: for example, instead of comprising a continuous cylinder at least one of them may alternatively comprise several independent cylindrical portions, that may be spaced apart from each other, and attached to the races of the bearings.

The parts 31 and 32 of the intermediate body may 30 also present further features, such as reinforcements, openings for inspecting the bearings, for example for controlling grease leaks from the bearings or for other operations related to lubrication; they may also be provided with elements, such as flanges, that in other turbines are associated with the blade or to the hub.

In the embodiments shown in the figures the bearings 10 and 20 are single-row ball bearings; however, it will be understood that many alternatives are possible, such as multiple-row bearings, bearings with rolling elements different from balls, tapered bearings, etc. Furthermore, the first and second bearings 10 and 20 may each have different features, so as to adapt to the different stresses each of them has to withstand.

For example, at least one of the bearings may be a preloaded slewing bearing, which are suitable to accommodate axial, radial and moment loads acting either singly or in combination and in any direction, and which may reduce the risk of false brinelling failure.

The first bearing may be stiffer than the second bearing, to provide enhanced stability also to the rest of the elements mounted over it (intermediate body, second bearing, . . . ).

In some embodiments, for example as shown in FIG. 8, the axial length ($L_1$) of the first bearing 10 may be larger than the axial length ($L_2$) of the second bearing (20).

The bearings 10 and 20 may be four-pint contact ball bearings. In some embodiments, the first bearing 10 may have a nominal contact angle smaller than 45°, while the second bearing 20 may have a nominal contact angle slightly above 45°.

Other potential embodiments of the bearings 10, 20 may involve using a larger amount of smaller rolling elements, such as balls, in the first bearing 10, and a smaller amount of larger rolling elements in the second bearing 20, to counteract the load increase.

A wind turbine according to embodiments of the invention comprises a rotor with a hub and blades and a pitch system as disclosed herein between the hub and each blade.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A pitch system for a wind turbine rotor, comprising:
a first bearing and a separate, detached second bearing, each of the first and second bearings provided with at least one row of rolling elements, the first and second bearings arranged between a hub and a blade root portion to allow rotation of the blade with respect to the hub, wherein the first bearing is arranged nearer to the hub than the second bearing in an axial direction;
a separate intermediate body absent of rolling elements aligned between the first bearing and the second bearing along a common line in the axial direction, the intermediate body comprising at least a blade-side part extending between a race of the first bearing that is associated with the blade and a race of the second bearing that is associated with the blade, wherein the race of the first and second bearings that is associated with the blade, and the blade-side part of the intermediate body, comprise a plurality of bores in the axial direction; and
a plurality of studs, each stud extending through a bore of the race of the first bearing, a bore of the blade-side part of the intermediate body, and a bore of the race of the second beating, to attach the races and blade-side part to the blade root portion.

2. The pitch system as claimed in claim 1, wherein the blade-side part of the intermediate body is substantially cylindrical.

3. The pitch system as claimed in claim 1, wherein the intermediate body further comprises a hub-side part arranged coaxially to the blade-side part and extending between a race of the first bearing that is associated with the hub and a race of the second bearing that is associated with the hub.

4. The pitch system as claimed in claim 3, wherein the race of the first and second bearings that is associated with the hub, and the hub-side part of the intermediate body, comprise a plurality of bores in the axial direction, the system further comprising a plurality of studs, each suitable to extend through a bore of the race of the first bearing, a bore of the hub-side part of the intermediate body, and a bore of the race of the second bearing, and to attach the races and hub-side part to the hub.

5. The pitch system as claimed in claim 3, wherein the hub-side part of the intermediate body is substantially cylindrical.

6. The pitch system as claimed in claim 1, wherein the intermediate body has an axial length which is at least equal to the total axial length of the first and second bearings or about twice the total axial length.

7. The pitch system as claimed in claim 1, wherein the blade-side part of the intermediate body is larger in the radial direction that the race of the first and second bearings that is associated with the blade.

8. The pitch system as claimed in claim 1, wherein at least one of the first and second bearings is a preloaded slewing bearing.

9. The pitch system as claimed in claim 1, wherein the first bearing has a greater stiffness than the second bearing.

10. The pitch system as claimed in claim 9, wherein the first bearing has a larger axial length than the second bearing.

11. The pitch system as claimed in claim 1, wherein the first bearing is a four-point contact ball bearing with a nominal contact angle smaller than 45".

12. The pitch system as claimed in claim 1, wherein the second bearing is a four-point contact ball bearing with a nominal contact angle greater than 45°.

13. The pitch system as claimed in claim 1, wherein the rolling elements of the first bearing are higher in number than those of the second bearing.

14. The pitch system as claimed in claim 1, wherein the rolling elements of the first bearing are smaller in size than those of the second bearing.

15. The pitch system as claimed in claim 1, further comprising at least a portion of an annular gear fixed to the a race of one of the first bearing or the second bearing, and suitable to mesh with a driving pinion of a pitch drive for changing the blade pitch.

16. The pitch system as claimed in claim 1, further comprising at least a portion of an annular gear fixed to the intermediate body and suitable to mesh with a driving pinion of a pitch drive for changing the blade pitch.

17. A wind turbine comprising the pitch system as claimed in claim 1.

18. The wind turbine as claimed in claim 17, wherein the first bearing and the second bearing have radially inner and radially outer races, the radially inner races of the first and second bearings adapted to be attached to the blade root portion and the radially outer races of the first and second bearings are adapted to be attached to the hub, whereby the blade-side part of the intermediate body is arranged between the radially inner race of the first bearing and the radially inner race of the second bearing.

19. A pitch system for a wind turbine rotor, comprising:
a first bearing and a separate, detached second bearing, each of the first and second bearings provided with an outer race, an inner race, and at least one row of rolling elements, the first and second bearings arranged between a hub of the wind turbine rotor and a blade root portion of the wind turbine rotor to allow rotation of the blade with respect to the hub;
a separate intermediate body absent of rolling elements aligned between the first bearing and the second bearing along a common line in an axial direction thereof
a plurality of studs extending through a race of the first bearing, the intermediate body and a race of the second bearing and attach the race of the first bearing, the intermediate body, and the race of the second bearing to a blade root portion.

* * * * *

UNITED STATES PATENT AND TRADEMARK OFFICE
CERTIFICATE OF CORRECTION

PATENT NO. : 9,567,973 B2
APPLICATION NO. : 13/928222
DATED : February 14, 2017
INVENTOR(S) : Pierre Pasquet Page 1 of 1

It is certified that error appears in the above-identified patent and that said Letters Patent is hereby corrected as shown below:

Claim 11 (Column 6, Line 34):
-- nominal contact angle smaller than 45" -- should read -- nominal contact angle smaller than 45° --

Signed and Sealed this
Twelfth Day of June, 2018

Andrei Iancu
*Director of the United States Patent and Trademark Office*